Figure 1:
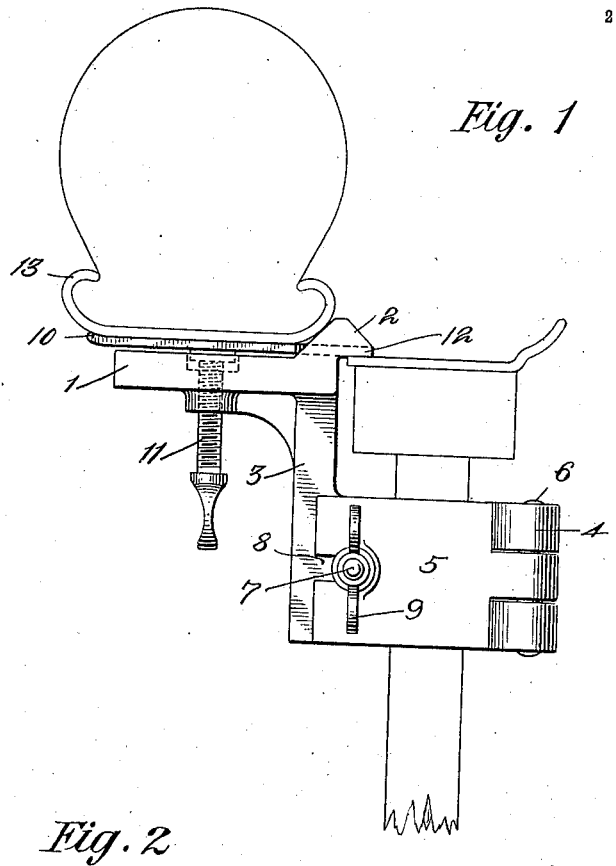

E. V. HARTFORD.
SUPPORT FOR WHEEL RIMS.
APPLICATION FILED MAR. 29, 1909.

996,241.

Patented June 27, 1911.

2 SHEETS—SHEET 1.

Witnesses:

Edward V. Hartford
Inventor
By his Attorneys

E. V. HARTFORD.
SUPPORT FOR WHEEL RIMS.
APPLICATION FILED MAR. 29, 1909.

996,241.

Patented June 27, 1911.

2 SHEETS—SHEET 2.

UNITED STATES PATENT OFFICE.

EDWARD V. HARTFORD, OF NEW YORK, N. Y.

SUPPORT FOR WHEEL-RIMS.

996,241.　　　　　Specification of Letters Patent.　Patented June 27, 1911.

Application filed March 29, 1909. Serial No. 486,429.

*To all whom it may concern:*

Be it known that I, EDWARD V. HARTFORD, a citizen of the United States, residing at the city of New York, borough of Manhattan, county and State of New York, have invented certain new and useful Improvements in Supports for Wheel-Rims, of which the following is a full, clear, and exact specification.

This invention relates to the repairing of vehicle tires, particularly pneumatic tires carried on so-called "demountable" or detachable rims, and has for its chief object to provide simple and effective means for holding such rims in fixed position during the removal and replacement of the tire.

As is well known, the repair of a punctured tire occasions considerable trouble and delay, particularly under unfavorable conditions of weather, and as a result the detachable rim is coming into extension use, as a means of obviating as far as possible the annoyance and trouble referred to. For this purpose the rims, with the tires on them, are made readily detachable from the wheels, and a spare rim, with a tire on it, is carried by the car, ready to be quickly substituted for an injured set when a puncture or other injury to a tire occurs. It will be seen, however, that when the spare set or sets have been used in this way any further damage to a tire or tires necessitates actual repairs, with the usual expenditure of time and labor, to say nothing of the annoyance, and often discomfort, occasioned thereby. The tires themselves are usually fastened to the detachable rims by means of devices which are inaccessible when the rim is in place on the wheel, and hence to repair the tire it is necessary to remove the rim from the wheel in order to reach the fastening devices and remove the tire from the rim. Conversely, the tire, after the repairs are made, must be replaced on the rim before the latter is put back on the wheel. The labor of replacing a tire under ordinary circumstances is considerable, but when the rim itself is detached from the wheel and therefore devoid of rigid support it will at once be seen that the labor is greatly increased.

My present invention is designed to do away with this extra labor, and to that end it consists, briefly stated, in the provision of means whereby the rim may be rigidly but detachably fixed to the wheel in such position as to leave the "lugs" or other tire-fastening devices readily accessible.

In carrying out my invention in the preferred manner I provide a plurality of supporting devices, say three in number, spaced about equidistantly around the wheel and projecting laterally therefrom. The supports are arranged with their outer surfaces at the periphery of the wheel felly and the outer surface or bearing of at least one of the devices is capable of adjustment radially with respect to the wheel; the supports themselves being rigidly but detachably secured to some part of the wheel, for example the spokes thereof.

When a tire is to be removed or replaced, the rim is slipped on the temporary supports and the radially adjustable bearing or bearings are then adjusted outwardly, thus bringing the same firmly against the inner surface of the rim and holding the rim in firm connection with the wheel. The work of removing or replacing the tire can then proceed without the extra labor required when the rim is detached from the wheel.

Figure 2:
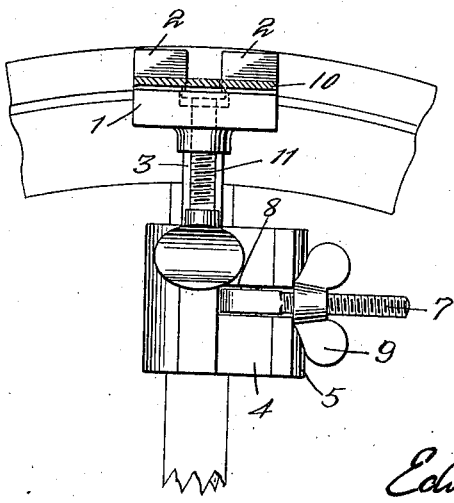
Figure 3:
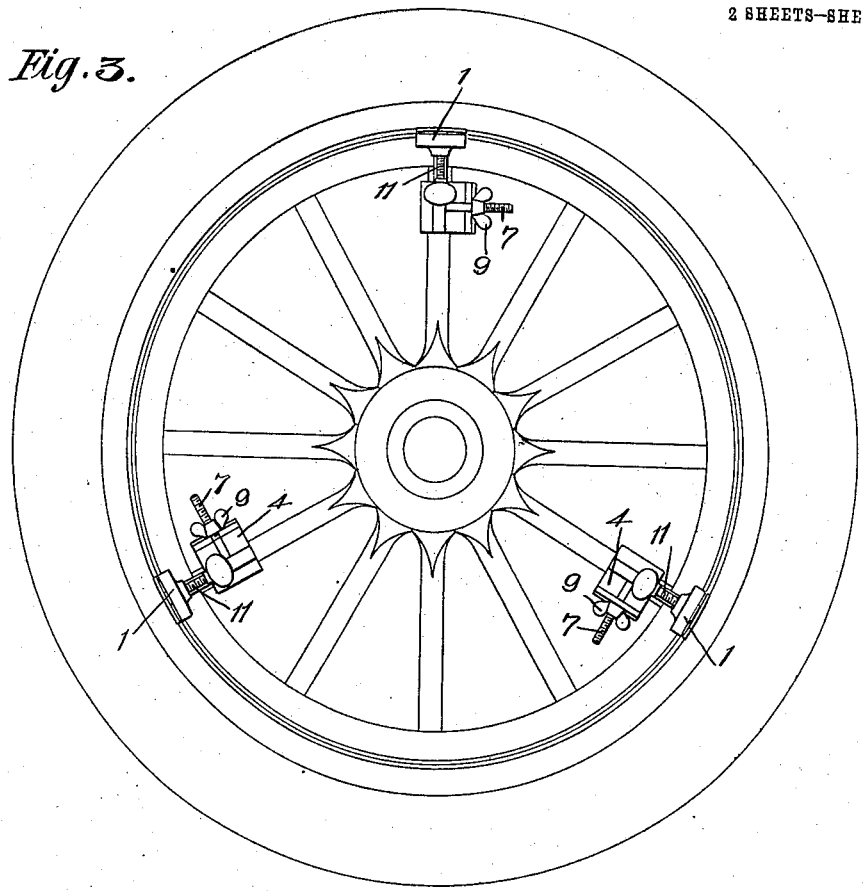
Figure 4:
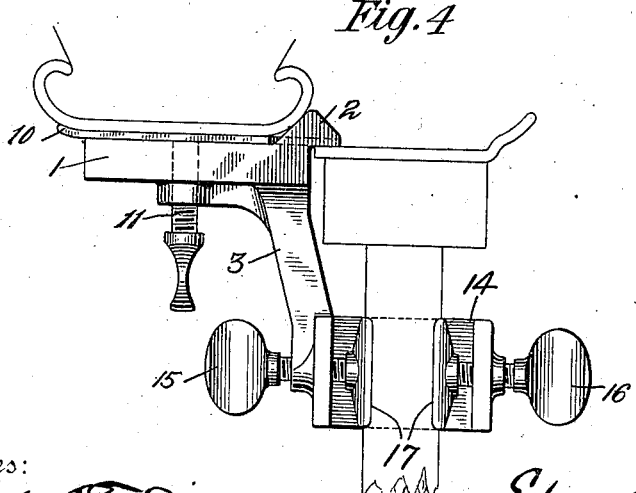

The embodiment thus briefly described is illustrated in the annexed drawings, and referring now thereto, Figure 1 shows the clamp in side elevation. Fig. 2 is a front view of the device, partly in section. Fig. 3 is an elevation of a vehicle wheel showing a tire secured by means of my improved clamps. Fig. 4 is a side view of a modification of the device.

The base member, 1, is in the form of a flat plate, and is provided with a pair of lugs or fingers 2 adapted to engage the felly of the wheel as shown in Fig. 1, with the said base projecting laterally from the wheel. The base member can be detachably fastened to a convenient part of the wheel, say one of the spokes. In the embodiment herein illustrated the said base is carried on the top of a member or arm 3 arranged radially of the wheel and having at its inner end a suitable clamp for rigid attachment to a spoke. In the form shown in Figs. 1 and 2, the spoke clamp comprises two jaws, 4, 5, hinged together at 6. The jaw 4 at its opposite end has a pivoted locking bolt 7, adapted to enter a slot 8 in the adjacent end of the other jaw 5, and provided with a thumb nut 9 by which the two jaws may be bound firmly on the spoke, as will be readily understood. If desired, the parts of the jaws which come in contact with the spoke may be lined with leather or equivalent material to avoid marring the finish of the spoke.

On the base member 1 is a base plate 10 to the under side of which a thumb screw 11 is rotatably attached, said plate being provided with a tongue 12 extending into the slot between the fingers 2 to prevent the plate from turning as the screw 11 is set up, which screw, as will be observed, works in a threaded aperture in the base member.

The manner of using the clamp will be readily understood from Figs. 1 and 3. The rim, indicated by 13, having been removed from the wheel, several of the clamps (say three) are fastened to as many spokes in the manner described, as shown in Fig. 3. The rim is then slipped over the base plates and the thumb screws 11 are set up, carrying the base plates radially outward against the inner surface of the rim. Inasmuch as the rim is rigid, this outward adjustment of the base plates causes them to engage the rim with great firmness, thereby holding the same securely in position so that the operator can readily loosen or remove the tire-retaining devices (not shown) and remove and replace the tire without further difficulty; whereas, as will be readily seen, to remove and replace the tire with the rim simply lying on the ground would involve a great deal more labor and trouble. The tire having been repaired and replaced on the rim the latter is taken off the clamp-supports, and is restored to the wheel in the usual way.

A modified form of clamp for attachment to the spoke is shown in Fig. 4. In this form the radial member 3 carries at its inner end a yoke 14 partially encircling the spoke and having two opposed clamping screws 15, 16, provided at their inner ends with bearing plates 17 for engagement with the spoke. As will be seen, this form of spoke-clamp enables the device to be used with a wider range of width of felly.

The devices herein specifically illustrated and described are simple and thoroughly effective for the purpose in hand, but it is to be understood that the invention may be embodied in various other forms without departure from its proper scope as defined by the appended claims.

What I claim is:

1. In a device of the character described, in combination, a base member having a pair of laterally projecting lugs to engage the felly of a vehicle wheel, a bearing plate on the base member, a screw connected with said plate to adjust the same toward and from the base member, an arm connected with the base member, and a clamp on said arm for attaching the device to the vehicle wheel, as set forth.

2. In a wheel rim support, the combination with a base provided with a tapped hole and felly engaging lugs, a plate mounted on the base, a thumb-screw mounted in the tapped hole and bearing on the plate, means for preventing rotation of the plate with the screw, and spoke clamping means carrying the base.

3. In a wheel rim support, the combination with a base, of an arm fast with the base and disposed transversely thereof, the base being disposed on one side of the arm and provided with a tapped hole disposed in substantial parallelism with the arm, felly engaging lugs carried by the base on the other side of the arm, a plate carried by the base member and provided with a bearing, a set screw disposed in said tapped hole and mounted in the bearing of said plate, means for preventing rotation of the plate with the set screw, and a spoke clamp carried by the arm on its lug carrying side and having a spoke recess disposed in substantial parallelism with the arm.

EDWARD V. HARTFORD.

Witnesses:
GEO. SHEFIELD,
A. G. HOFFMAN.

---

Copies of this patent may be obtained for five cents each, by addressing the "Commissioner of Patents, Washington, D. C."